(12) United States Patent
Hsieh et al.

(10) Patent No.: US 9,181,356 B2
(45) Date of Patent: Nov. 10, 2015

(54) HYDROGENATION CATALYST COMPOSITION AND HYDROGENATION METHOD THEREOF

(75) Inventors: Chi-Chen Hsieh, Kaohsiung (TW); Chih-Kuang Tsai, Kaohsiung (TW); Yen-Hsian Li, Fongshan (TW); Ming-Cheng Chiu, Kaohsiung (TW)

(73) Assignee: TSRC CORPORATION, Taipei (TW)

( * ) Notice: Subject to any disclaimer, the term of this patent is extended or adjusted under 35 U.S.C. 154(b) by 455 days.

(21) Appl. No.: 12/782,434

(22) Filed: May 18, 2010

(65) Prior Publication Data

US 2011/0105694 A1     May 5, 2011

(30) Foreign Application Priority Data

Oct. 30, 2009 (TW) ............................... 98137019 A (51) Int. Cl.
*C08C 19/02* (2006.01)
(52) U.S. Cl.
CPC ..................................... *C08C 19/02* (2013.01)
(58) Field of Classification Search
USPC .................. 502/158, 118, 124, 152
See application file for complete search history.

(56) References Cited

U.S. PATENT DOCUMENTS

| 4,980,421 A | 12/1990 | Teramoto et al. |
| 5,244,980 A | 9/1993 | Gibler et al. |
| 5,270,274 A | 12/1993 | Hashiguchi et al. |
| 5,886,108 A | 3/1999 | Miyamoto et al. |
| 5,948,869 A | 9/1999 | Vallieri et al. |
| 5,985,995 A | 11/1999 | Calle et al. |
| 6,313,230 B1 | 11/2001 | Tsai et al. |
| 7,186,782 B2 | 3/2007 | Lin et al. |
| 7,700,694 B2 | 4/2010 | Lin et al. |

FOREIGN PATENT DOCUMENTS

| EP | 0434469 A2 | 6/1991 |
| EP | 0544304 A1 | 6/1993 |
| FR | 2900352 | 11/2007 |
| JP | 09094462 | 8/1997 |
| JP | 2001302816 | 10/2001 |
| JP | 2003342315 A | * 12/2003 |
| KR | 687062 B1 | * 2/2007 |
| KR | 100687062 | 2/2007 |
| TW | 200607822 | 3/2006 |
| TW | 200829614 | 7/2008 |

* cited by examiner

*Primary Examiner* — Kelechi Egwim
(74) *Attorney, Agent, or Firm* — Volpe and Koenig, P.C.

(57) ABSTRACT

A hydrogenation catalyst composition for hydrogenating a polymer of conjugated diene is provided. The polymer of conjugated diene is a homopolymer of conjugated diene or a copolymer of conjugated diene and vinyl aromatics. The hydrogenation catalyst composition includes: (a) a titanium compound, (b) a compound of formula (II),

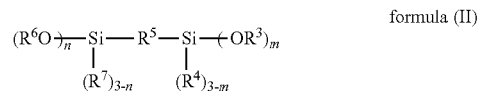

formula (II)

where $R^5$ is $C_1$~$C_{12}$ alkyl, alkenyl, amine, ether, ketone or ester groups, $R^3$ and $R^6$ are $C_1$~$C_{12}$ alkyl or alkenyl groups, $R^4$ and $R^7$ are $C_1$~$C_{12}$ alkyl, alkenyl, amine, ether, ketone or ester groups, n and m are integrals, $1 \leq n \leq 3$, $1 \leq m \leq 3$, and (c) alkyl aluminum.

19 Claims, 2 Drawing Sheets

HYDROGENATION CATALYST COMPOSITION AND HYDROGENATION METHOD THEREOF

FIELD OF THE INVENTION

The present invention relates to a hydrogenation catalyst composition and a hydrogenation method, and more particularly to a catalyst composition and a method for hydrogenating the polymers formed by the conjugated diene.

BACKGROUND OF THE INVENTION

In the industries, the conjugated diene monomers are homo-polymerized or copolymerized to form the polymers with unsaturated alkenyl groups in their molecular chains. These polymers can be beneficially used for vulcanization. However, the existences of a large amount of these unsaturated double bonds result in the poor performances of weathering resistance, heat resistance and anti-oxidation. These conditions become severe for those polymers, such as thermoplastic rubbers with physical crosslinkages, formed by polymerizing the conjugated diene monomers and vinyl aromatic hydrocarbon monomers, and more severe when used with the modifiers of styrene resins and alkenyl resins and with the impact resistance materials. These copolymers find limited applications as outdoor materials because of their poor performances of weathering resistance, heat resistance and anti-oxidation.

For the polymers formed by polymerizing the conjugated diene monomers and vinyl aromatic hydrocarbon monomers, the drawbacks of poor performances of weathering resistance, heat resistance and anti-oxidation for these polymers can be improved by the hydrogenation method to largely reduce the unsaturated double bonds. There are numerous catalysts for hydrogenating the polymers with unsaturated double bonds. These hydrogenation catalysts can be classified into two categories:

(1) heterogeneous catalysts, which are often deposited on a supporter, such as active carbon, silica, alumina, or calcium carbonate. The metal-contained heterogeneous catalysts are usually the compounds made by nickel, platinum, or palladium.

(2) homogenous catalysts, for example, (a) Ziegler-Natta catalysts composed of an organic salt of nickel, cobalt, iron, or chromium, and a reducing agent such as an organic aluminum compound, and (b) organometallic compounds containing one of Ru, Rh, Ti and La.

Although widely used in industry, heterogeneous catalysts have lower activity than the homogeneous catalyst. Therefore, in order to obtain the desired hydrogenation, a large amount of heterogeneous catalyst is required and the hydrogenation must be conducted at higher temperature and pressure. In contrast, the homogeneous catalysts are usually more active, a smaller amount of homogeneous catalysts is enough, and the hydrogenation can be conducted at mild temperature and pressure.

The hydrogenation method by using a heterogeneous catalyst is described as follows. First, the polymers to be hydrogenated are dissolved in a suitable solvent. Then, the polymers are brought into contact with hydrogen in the presence of a heterogeneous catalyst. When the polymers are hydrogenated, the viscosity of the polymers is quite high, and the contact between the polymers and the catalyst is difficult due to the interferences of the approach to the activation center by the steric hindrance of the polymers and the high absorption of the polymers, since the hydrogenated polymers tend to stay on the surface of the catalyst. Meanwhile, the hydrogenation requires higher temperature and pressure as the reactivity of the catalyst suddenly drops during the hydrogenation of the polymers, and therefore the decomposition of the polymers or the gelation of the reaction system tends to occur under such high temperature. Thus, under such operation conditions of the hydrogenation of the copolymers formed from the vinyl aromatic hydrocarbon monomers and the conjugated diene monomers, it is very difficult to selectively hydrogenate the double bonds in the conjugated diene portions. The reason is that the benzene rings in the vinyl aromatic units have been hydrogenated under such high temperature and high pressure. In addition, since the polymer is strongly adsorbed on the heterogeneous catalyst, it is impossible to completely remove the catalyst from the hydrogenated polymer solution.

In the Ziegler-Natta catalyst system, the hydrogenation reaction proceeds in the homogeneous mediums, so the hydrogenation reaction can be controlled under appropriate pressure and temperature. Thus, the hydrogenation reaction conditions can be selected to allow only the double bonds on the diene units to be hydrogenated without hydrogenating the aromatic rings on the vinyl aromatic units. However, the larger amount of the catalyst is still required. That is, the higher concentration of the catalyst is necessary. The catalyst can not be removed from the products easily, and the process of the catalyst removal is required for the post-treatment after the hydrogenation reaction, thereby making the product unstable and consuming the energy for removing the catalyst.

The conventional processes for the hydrogenation of conjugated diene polymers by using the homogeneous catalysts are summarized below.

U.S. Pat. No. 4,980,421 discloses a process for selectively hydrogenating a conjugated diene polymer by using the hydrogenation catalyst including a bis(cyclopentadienyl) titanium(+4) compound, an alkoxy lithium compound, and an organometallic compound (such as aluminum, zinc, or magnesium compound). This hydrogenation catalyst has high activity, and thus a small amount is required to reach the hydrogenation effect. Moreover, the deash process is not required and the reaction can proceed under mild conditions for this hydrogenation catalyst.

U.S. Pat. No. 5,270,274 discloses a hydrogenation catalyst composition including a bis(cyclopentadienyl) titanium(+4) compound, a compound containing polar carbonyl groups and epoxy groups, and an organic lithium compound. The unsaturated double bonds in the conjugated diene polymer can be preferentially hydrogenated. The hydrogenated polymers have superior physical properties and weathering resistance.

U.S. Pat. No. 5,244,980 discloses a hydrogenation process including terminating a living conjugated diene polymer with hydrogen and then adding an organo alkali metal and a Tebbe's catalyst, which has good hydrogenation efficiency is disclosed therein.

U.S. Pat. No. 5,886,108 discloses hydrogenating a living conjugated diene polymer introduced with hydroxyl, carbonyl or ester group by using the Tebbe's catalyst prepared by the reaction of a bis(cyclopentadienyl) titanium(+4) compound and trimethyl aluminum. This patent discloses that the hydrogenation efficiency is good when the mentioned compound is included in the reaction.

U.S. Pat. No. 5,985,995 discloses a catalyst composition. When a living conjugated diene polymer is combined with bis(cyclopentadienyl)Ti(PhOCH$_3$)$_2$ and alkyl silicon halide or alkyl tin halide. This patent discloses that the reaction reacted with the mentioned catalyst composition has very good hydrogenation efficiency.

U.S. Pat. No. 5,948,869 discloses a selective hydrogenation of unsaturated double bonds in conjugated diene polymers, where the catalyst composition includes a bis(cyclopentadienyl) titanium(+4) compound, an alkyl zinc or alkyl magnesium, and the promoter of the solvent with ether or aromatic groups. This patent discloses that the mentioned catalyst composition increases the hydrogenation efficiency obviously.

European Patent Appl. No. 0434469A2 discloses a catalyst composition for hydrogenating a conjugated diene polymer, where the catalyst composition includes a bis(cyclopentadienyl) titanium compound, an alkoxy alkali metal, and a polar compound of ether, ketone or other types. The catalyst system has capacities of hydrogenating conjugated diene polymers and the copolymers thereof.

European Patent Appl. No. 0544304A1 discloses a catalyst composition including (a) a bis(cyclopentadienyl) transition metal compound; (b) a polar compound containing carbonyl groups or epoxy groups such as esters of monoacids or diacids, internal ester, internal amide or epoxy; (c) an organic lithium compound; and (d) a reducing organometalic compound such as aluminum compound, zinc compound, or magnesium compound, for example, triethyl aluminum. This patent discloses that the mentioned catalyst composition increases the hydrogenation efficiency obviously.

U.S. Pat. No. 6,313,230 discloses the selective hydrogenation of the unsaturated double bonds of conjugated diene polymers, where the catalyst composition includes a bis(cyclopentadienyl) titanium(+4) compound and a tri-substituted silane with Si—H functional group. It is described that this catalyst composition can promote the hydrogenation efficiency. However, the silane contains hydrogen, thus tends to be hydrolyzed easily and reacted with oxygen or polar functional groups easily, and accordingly is hard to be stored at room temperature. In addition, from the embodiments of this patent, it is known that the highest reaction temperature is 60° C., the hydrogenation reaction cannot continuously proceed under high temperature, and the catalyst composition therein would deactivated under high temperature hydrogenation reaction. Thus a large amount of heat during the hydrogenation reaction must be removed; otherwise the hydrogenation efficiency will be low. This catalyst composition can not be stored under nitrogen gas for a long time, and the activity of the catalyst easily decays. The catalyst composition after the preparation must be used in short time; otherwise the hydrogenation rate can not be easily controlled. According, this catalyst composition is not suitable for the continuous manufacture.

According to the above descriptions, although many catalyst compositions had been used for hydrogenating a polymer formed by a conjugated diene, several problems of instability of the products and tedious procedures to remove the catalyst due to the large amount of the catalyst required. In order to solve the above-mentioned problems, after a lot of experiments and analyses, the research and development team of the present invention has developed novel hydrogenation methods with the catalyst compositions, which are stable and can be easily stored. In the present invention, only a small amount of the catalyst composition is needed, the removal of the catalyst from the hydrogenated compound is no longer required, and the polymers of conjugated dienes can be successfully hydrogenated. Moreover, the catalyst compositions of the present invention still have high catalysis activities at high temperature, and therefore are very suitable for the commercial mass production.

SUMMARY OF THE INVENTION

The present invention provides a catalyst composition for the hydrogenation reaction and the hydrogenation method by using the same. The hydrogenation rate by using the hydrogenation method of the present invention is much higher than that by using the conventional method.

In accordance with one aspect of the present invention, a catalyst composition for hydrogenating a conjugated diene polymer, which is one of a homopolymers formed by the conjugated diene and a copolymer formed by the conjugated diene and a vinyl aromatic, is provided. The catalyst composition comprises a titanium compound; a compound having a structure of Formula (II):

wherein the $R^5$ is one selected from a group consisting of $C_1$~$C_{12}$ alkyl, $C_1$~$C_{12}$ alkenyl, $C_1$~$C_{12}$ amide, $C_1$~$C_{12}$ ether, $C_1$~$C_{12}$ ketone and $C_1$~$C_{12}$ ester, either one of the $R^3$ and the $R^6$ is one of $C_1$~$C_{12}$ alkyl and $C_1$~$C_{12}$ alkenyl, either one of the $R^4$ and the $R^7$ is one selected from a group consisting of $C_1$~$C_{12}$ alkyl, $C_1$~$C_{12}$ alkenyl, $C_1$~$C_{12}$ amide, $C_1$~$C_{12}$ ether, $C_1$~$C_{12}$ ketone and $C_1$~$C_{12}$ ester, n and m are natural numbers, n≤3, and m≤3; and an alkyl aluminum.

In one embodiment, the titanium compound is $(Cp^*)_2Ti R^1R^2$, either one of the $R^1$ and the $R^2$ is one selected from a group consisting of hydrogen, halogen, $C_1$~$C_8$ alkyl, $C_1$~$C_8$ alkoxy, $C_6$~$C_{12}$ cycloalkyl, phenyl, phenoxy, $C_7$~$C_{10}$ arylalkoxy, $C_7$~$C_{10}$ arylalkyl, carboxy, —$CH_2P(phenyl)_2$, —$CH_2Si(C_1$~$C_5$ alkyl$)_3$ and —$P(phenyl)_2$, the $Cp^*$ is one selected from a group consisting of cyclopendienyl, fluorenyl, indenyl and derivatives thereof, and the derivative is formed by substituting at least a hydrogen on one selected from a group consisting of the cyclopendienyl, the fluorenyl and the indenyl, with a substituting group.

In one embodiment, the titanium compound is a dicyclopentadienyl titanium halide and derivatives thereof.

In one embodiment, the titanium compound is one selected from a group consisting of bis(cyclopentadienyl) titanium difluorides, bis(cyclopentadienyl) titanium dichloride, bis(2,4-diphenyl phosphine cyclopentadienyl) titanium difluoride, bis(2,4-dimethyl phosphine cyclopentadienyl) titanium dichloride, bis(methoxy cyclopentadienyl) titanium dichloride, bis(2,4-dimethyl phosphine cyclopentadienyl) titanium dichloride, bis(cyclopentadienyl) titanium dibromide, bis(2,4-diphenyl phosphine cyclopentadienyl) titanium dibromide, bis(2,4-dimethyl phosphine cyclopentadienyl) titanium dibromide, bis(ethyl cyclopentadienyl) titanium dichloride, bis(n-propyl cyclopentadienyl) titanium dichloride, bis(n-butyl cyclopentadienyl) titanium dichloride and bis(2-ethyl hexyl cyclopentadienyl) titanium dichloride.

In one embodiment, the titanium compound is one selected from a group consisting of a dicyclopentadienyl alkoxy titanium, a dicyclopentadienyl alkyl titanium and a derivative thereof.

In one embodiment, the titanium compound is one selected from a group consisting of dimethyl dicyclopentadienyl titanium, dimethoxy dicyclopentadienyl titanium, dimethyl bis (2,4-diphenyl phosphine cyclopentadienyl) titanium, dimethoxy bis(2,4-dimethyl phosphine cyclopentadienyl) titanium, diethyl dicyclopentadienyl titanium, diethyl bis(2,4-diphenyl phosphine cyclopentadienyl) titanium, diethoxy bis(2,4-dimethyl phosphine cyclopentadienyl) titanium, diphenoxy bis(2,4-diphenyl phosphine cyclopentadienyl) titanium and diphenoxy bis(2,4-dimethyl phosphine cyclopentadienyl) titanium.

In one embodiment, the titanium compound is one selected from a group consisting of difluorenyl titanium halide, diindenyl titanium halide and a derivative thereof.

In one embodiment, the titanium compound is one selected from a group consisting of difluorenyl titanium dichloride, diindenyl titanium dichloride, bis(dimethoxy fluorenyl) titanium dichloride, difluorenyl titanium difluoride, diindenyl titanium difluoride, bis(dimethoxy fluorenyl) titanium difluoride, difluorenyl titanium dibromide, diindenyl titanium dibromide, diindenyl titanium dichloride, bis(dimethoxy fluorenyl) titanium dibromide and diindenyl titanium dibromide.

In one embodiment, the titanium compound is one selected from a group consisting of alkoxy difluorenyl titanium, alkyl difluorenyl titanium, alkoxy diindenyl titanium, alkyl diindenyl titanium and a derivative thereof.

In one embodiment, the titanium compound is one selected from a group consisting of dimethyl difluorenyl titanium, dimethoxy difluorenyl titanium, dimethoxy diindenyl titanium, dimethoxy bis(dimethoxy fluorenyl) titanium, diphenoxy difluorenyl titanium, diphenoxy diindenyl titanium, diphenoxy bis(dimethoxy fluorenyl) titanium and diphenoxy diindenyl titanium.

In one embodiment, either one of the $R^3$ and the $R^6$ is $C_1$~$C_8$ alkyl, either one of the $R^4$ and the $R^7$ is one selected from a group consisting of $C_1$~$C_8$ alkyl, $C_1$~$C_8$ amide, $C_1$~$C_8$ ether and $C_1$~$C_8$ ketone, and the $R^5$ is one selected from a group consisting of $C_1$~$C_8$ alkyl, $C_1$~$C_8$ amide, $C_1$~$C_8$ ether and $C_1$~$C_8$ ketone.

In one embodiment, either one of the $R^3$ and the $R^6$ is $C_1$~$C_4$ alkyl, either one of the $R^4$ and the $R^7$ is $C_1$~$C_6$ alkyl, and the $R^5$ is $C_1$~$C_8$ alkyl.

In one embodiment, either one of the $R^3$ and the $R^6$ is $C_1$~$C_4$ alkyl, either one of the $R^4$ and the $R^7$ is $C_1$~$C_6$ alkyl, and the $R^5$ is $R^{11}R^{12}R^{13}N$ having one of following two conditions: wherein the $R^{11}$, the $R^{12}$ and the $R^{13}$ are $C_1$~$C_6$ alkyls; and wherein only one of the $R^{11}$, the $R^{12}$ and the $R^{13}$ is a hydrogen atom, and the others are $C_1$~$C_6$ alkyls.

In one embodiment, either one of the $R^3$ and the $R^6$ is $C_1$~$C_4$ alkyl, either one of the $R^4$ and the $R^7$ is $C_1$~$C_6$ alkyl, the $R^5$ is an ether of $R^{14}OR^{15}$, and either one of the $R^{14}$ and the $R^{15}$ is $C_1$~$C_6$ alkyl.

In one embodiment, either one of the $R^3$ and the $R^6$ is $C_1$~$C_4$ alkyl, either one of the $R^4$ and the $R^7$ is $C_1$~$C_6$ alkyl, the $R^5$ is a ketone of $R^{16}COR^{17}$, and either one of the $R^{16}$ and the $R^{17}$ is $C_1$~$C_6$ alkyl.

In one embodiment, either one of the $R^3$ and the $R^6$ is $C_1$~$C_4$ alkyl, either one of the $R^4$ and the $R^7$ is $C_1$~$C_6$ alkyl, $C_1$~$C_8$ amide, $C_1$~$C_8$ ether and $C_1$~$C_8$ ketone, the $R^5$ is one of $C_1$~$C_6$ alkyl and $R^{18}NHR^{19}$, and either one of the $R^{18}$ and the $R^{19}$ is $C_1$~$C_4$ alkyl.

In one embodiment, the alkyl aluminum is $R^8R^9R^{10}Al$, and each of the $R^8$, the $R^9$ and the $R^{10}$ is one selected from a group consisting of $C_1$~$C_{12}$ alkyl, $C_6$~$C_{12}$ aryl, a hydrogen atom and a halogen atom.

In one embodiment, the alkyl aluminum is one selected from a group consisting of trimethyl aluminum, triethyl aluminum, tri-n-propyl, triisopropyl aluminum, tri-n-butyl aluminum, tri-tert-butyl aluminum, triisobutyl aluminum, tri-n-pentyl aluminum, triisopentyl aluminum, tri-n-hexyl aluminum, triisohexyl aluminum, tri(1-methyl pentyl) aluminum, tri(2,5-dimethyl octyl) aluminum, tri(2,6-dimethyl octyl) aluminum, tri(2-ethyl hexyl) aluminum, triphenyl aluminum, diethyl aluminum chloride, ethyl aluminum dichloride, dipropyl aluminum chloride, dibutyl aluminum chloride, diisobutyl aluminum chloride, butyl aluminum dichloride and a combination thereof.

In one embodiment, the conjugated diene polymer is polymerized by a method being one selected from a group consisting of cationic polymerization, free radical polymerization, coordination polymerization and anionic polymerization; the titanium compound, the compound having a structure of Formula (II) and the alkyl aluminum are added into the a solution of the conjugated diene polymer in a way being one of at a same time and at different times; a usage quantity of the titanium compound is in a range of 0.001 to 50 mmol relative to 100 gram of the conjugated diene polymer; a molar ratio of the compound having a structure of Formula (II) to the titanium compound is in a range of 0.1 to 50; a molar ratio of the alkyl aluminum to the titanium compound is in a range of 0.1 to 50; the conjugated diene polymer has a weight average molecular weight in a range of 1000 to 1,000,000; and the conjugated diene polymer includes conjugated diene units in weight percentage range of 5% to 85%.

In accordance with another aspect of the present invention, a hydrogenation method for hydrogenating a conjugated diene polymer, which is one of a homopolymers formed by polymerizing the conjugated diene and a copolymer formed by polymerizing the conjugated diene and a vinyl aromatic, is provided. The hydrogenation method comprises dissolving the conjugated diene polymer, which includes a conjugated diene unit having an unsaturated double bond, in an inert solvent; adding the catalyst composition of Claim 1 into the conjugated diene polymer solution; and hydrogenating the unsaturated double bond by introducing a hydrogen gas.

In one embodiment, the hydrogenating step is performed under a temperature in a range of 0° C. to 200° C. and under a pressure in a range of 1 to 90 kg/cm2; a hydrogenation rate for the unsaturated double bond is higher than 50%; and the conjugated diene polymer includes a vinyl aromatic unit having a phenyl double bond, and a hydrogenation rate for the phenyl double bond is lower than 10%.

In one embodiment, the hydrogenation rate for the unsaturated double bond is higher than 90%, and the hydrogenation rate for the phenyl double bond is lower than 5%.

In one embodiment, the copolymer is one selected from a group of a styrene-butadiene copolymer, a styrene-isoprene copolymer and a styrene-(butadiene/isoprene) copolymer.

In one embodiment, the styrene-butadiene copolymer after the hydrogenation becomes a styrene-ethylene-butadiene-styrene copolymer, and the styrene-isoprene copolymer after the hydrogenation becomes a styrene-ethylene-propylene-styrene copolymer, and the styrene-(butadiene/isoprene) copolymer after the hydrogenation becomes a styrene-ethylene-ethylene-propylene-styrene copolymer.

In one embodiment, the copolymer is one of a block copolymer and a random copolymer.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention provides the hydrogenation catalyst composition containing the catalysts (a), (b) and (c), wherein the catalyst (a) includes a titanium compound of the formula (I) and a mixture thereof:

Formula (I)

wherein $R^1$ and $R^2$ are identical or different substituents and are selected from the group consisting of hydrogen, halogen, $C_1 \sim C_8$ alkyl, $C_1 \sim C_8$ alkoxy, $C_6 \sim C_{12}$ cycloalkyl, phenyl, phenoxy, $C_7 \sim C_{10}$ arylalkoxy, $C_7 \sim C_{10}$ arylalkyl, carboxy, $-CH_2P(phenyl)_2$, $-CH_2Si(C_1 \sim C_5 \text{ alkyl})_3$ and $-P(phenyl)_2$; and Cp* is one selected from the group consisting of fluorenyl, indenyl, cyclopendienyl and derivatives thereof. Here the derivatives are fluorenyl, indenyl or cyclopendienyl ring, on which one or more hydrogen atoms are replaced by the substituted group(s).

In the present invention, for example, Cp* can be $C_5R^{11}R^{12}R^{13}R^{14}R^{15}$ (cyclopentadienyl and derivatives thereof), wherein $R^{11}$, $R^{12}$, $R^{13}$, $R^{14}$ and $R^{15}$ can be the same or different substituents and are ones selected from the group consisting of hydrogen, halogen, alkyl, aryl, carboxyl, $-CH_2P(phenyl)_2$, $-CH_2Si(C_1 \sim C_5 \text{ alkyl})_3$ and $-P(phenyl)_2$.

Regarding the catalyst (a) of the formula (I), a bis(cyclopentadienyl and a derivative thereof) titanium halide used suitably in the present invention can be one selected from the group consisting of bis(cyclopentadienyl) titanium difluorides, bis(cyclopentadienyl) titanium dichlorides, bis(2,4-diphenyl phosphine cyclopentadienyl) titanium difluorides, bis(2,4-dimethyl phosphine cyclopentadienyl) difluorides, bis(2,4-diphenyl phosphine cyclopentadienyl) titanium dichlorides, bis(dimethoxy cyclopentadienyl) titanium dichloride, bis(2,4-diethyl phosphine cyclopentadienyl) titanium dichlorides, bis(cyclopentadienyl) titanium dibromides, bis(2,4-diphenyl phosphine cyclopentadienyl) titanium dibromides, bis(2,4-dimethyl phosphine cyclopentadienyl) titanium dibromides, bis(ethyl cyclopentadienyl) titanium dichlorides, bis(n-propyl cyclopentadienyl) titanium dichlorides, bis(n-butyl cyclopentadienyl) titanium dichlorides, and bis(2-ethyl hexyl cyclopentadienyl) titanium dichlorides. Regarding the catalyst (a) of the formula (I), the alkoxy or alkyl compound of bis(cyclopentadienyl and a derivative thereof) titanium used suitably in the present invention can be one selected from the group consisting of bis(cyclopentadienyl) titanium dimethyl, bis(cyclopentadienyl) titanium dimethoxy, bis(2,4-diphenyl phosphine cyclopentadienyl) titanium dimethoxy, bis(2,4-dimethyl phosphine cyclopentadienyl) titanium dimethoxy, bis(cyclopentadienyl) titanium dimethoxy, bis(2,4-diphenyl phosphine cyclopentadienyl) titanium dimethoxy, bis(2,4-dimethyl phosphine cyclopentadienyl) titanium dimethoxy, bis(2,4-diphenyl phosphine cyclopentadienyl) titanium diphenoxy, and bis(2,4-dimethyl phosphine cyclopentadienyl) titanium diphenoxy.

Regarding the catalyst (a) of the formula (I), the bis(fluorenyl, indenyl and a derivative thereof) titanium halide used suitably in the present invention can be one selected from the group consisting of bis(1-fluorenyl) titanium dichlorides, bis(1-indenyl) titanium dichlorides, bis(dimethoxy fluorenyl) titanium dichlorides, bis(indenyl) titanium dichlorides, bis(fluorenyl) titanium difluorides, bis(indenyl) titanium difluorides, bis(dimethoxy fluorenyl) titanium difluorides, bis(indenyl) titanium difluorides, bis(fluorenyl) titanium dibromides, bis(indenyl) titanium dibromides, bis(dimethoxy fluorenyl) titanium, bis(indenyl) titanium dibromides. Regarding the catalyst (a) of the formula (I), the alkoxy or alkyl compound of bis(fluorenyl, indenyl and a derivative thereof) titanium halide used suitably in the present invention can be one selected from the group consisting of bis(fluorenyl) titanium dimethyl, bis(fluorenyl) titanium dimethoxy, bis(indenyl) titanium dimethoxy, bis(dimethoxy fluorenyl) titanium dimethoxy, bis(fluorenyl) titanium diphenoxy, bis(indenyl) titanium diphenoxy, bis(dimethoxy fluorenyl) titanium diphenoxy, and bis(indenyl) titanium diphenoxy. Here the derivatives are fluorenyl, indenyl or cyclopendienyl ring, on which one or more hydrogen atoms are replaced by the substituted group(s). The substituted group can be selected from the group consisting of methyl, methoxy, p-tert-butylphenyl, pentafluorophenyl, trifluorophenyl, difluorophenyl, or 3,5-(tert-butyl)-4-methoxyphenyl. One preferred example of the catalyst (a) is bis(cyclopentadienyl) titanium dichloride.

The catalyst (b) of the present invention is a compound with a structure of Formula (II):

Formula (II)

wherein the $R^5$ is one selected from a group consisting of $C_1 \sim C_{12}$ alkyl, $C_1 \sim C_{12}$ alkenyl, $C_1 \sim C_{12}$ amide, $C_1 \sim C_{12}$ ether, $C_1 \sim C_{12}$ ketone and $C_1 \sim C_{12}$ ester, either one of the $R^3$ and the $R^6$ is one of $C_1 \sim C_{12}$ alkyl and $C_1 \sim C_{12}$ alkenyl, either one of the $R^4$ and the $R^7$ is one selected from a group consisting of $C_1 \sim C_{12}$ alkyl, $C_1 \sim C_{12}$ alkenyl, $C_1 \sim C_{12}$ amide, $C_1 \sim C_{12}$ ether, $C_1 \sim C_{12}$ ketone and $C_1 \sim C_{12}$ ester, n and m are natural numbers, n≤3, and m≤3.

In one embodiment, for the catalyst (b), either one of the $R^3$ and the $R^6$ is $C_1 \sim C_8$ alkyl, and either one of the $R^4$, $R^5$ and the $R^7$ is one selected from a group consisting of $C_1 \sim C_8$ alkyl, $C_1 \sim C_8$ amide, $C_1 \sim C_8$ ether and $C_1 \sim C_8$ ketone.

In one embodiment, for the catalyst (b), either one of the $R^3$ and the $R^6$ is $C_1 \sim C_4$ alkyl, either one of the $R^4$ and the $R^7$ is $C_1 \sim C_6$ alkyl, and the $R^5$ is $C_1 \sim C_8$ alkyl.

In one embodiment, for the catalyst (b), either one of the $R^3$ and the $R^6$ is $C_1 \sim C_4$ alkyl, either one of the $R^4$ and the $R^7$ is $C_1 \sim C_6$ alkyl, and the $R^5$ is $R^{11}R^{12}R^{13}N$ where the $R^{11}$, $R^{12}$ and $R^{13}$ are $C_1 \sim C_6$ alkyls or only one of the $R^{11}$, $R^{12}$ and $R^{13}$ is a hydrogen atom, and the others are $C_1 \sim C_6$ alkyls.

In one embodiment, for the catalyst (b), either one of the $R^3$ and $R^6$ is $C_1 \sim C_4$ alkyl, either one of the $R^4$ and $R^7$ is $C_1 \sim C_6$ alkyl, and the $R^5$ is an ether of $R^{14}OR^{15}$, where either one of the $R^{14}$ and $R^{15}$ is $C_1 \sim C_6$ alkyl.

In one embodiment, for the catalyst (b), either one of the $R^3$ and $R^6$ is $C_1 \sim C_4$ alkyl, either one of the $R^4$ and $R^7$ is $C_1 \sim C_6$ alkyl, and the $R^5$ is a ketone of where either one of the $R^{16}$ and the $R^{17}$ is $C_1$~$C_6$ alkyl.

In one embodiment, for the catalyst (b), either one of the $R^3$ and $R^6$ is $C_1$~$C_4$ alkyl, either one of the $R^4$ and $R^7$ is $C_1$~$C_6$ alkyl, $C_1$~$C_8$ amide, $C_1$~$C_8$ ether or $C_1$~$C_8$ ketone, and the $R^5$ is $C_1$~$C_6$ alkyl or $R^{18}NHR^{19}$, where either one of the $R^{18}$ and the $R^{19}$ is $C_1$~$C_4$ alkyl.

In one embodiment, when n=1 and m=1, the catalyst (b) with the structure of formula (II) can be bis(methoxy dimethyl silyl)ethane, bis(methoxy dimethyl silyl) hexane, bis(methoxy dimethyl silyl propyl) amine, bis(methoxy diethyl silyl)ethane, bis(methoxy diethyl silyl) hexane, bis(methoxy diethyl silyl propyl) amine, bis(ethoxy dimethyl silyl) butane, bis(ethoxy dimethyl silyl) hexane, bis(ethoxy dimethyl silyl propyl) amine, bis(ethoxy diethyl silyl)ethane, bis(ethoxy diethyl silyl) hexane, bis(ethoxy diethyl silyl propyl) amine, bis(propyl dimethyl silyl)ethane, bis(propoxy dimethyl silyl) hexane, bis(propoxy dimethyl silyl propyl) amine, bis(propoxy diethyl silyl)ethane, bis(propoxy diethyl silyl) hexane, bis(propoxy diethyl silyl propyl) amine, bis(isopropoxy dimethyl silyl) hexane, bis(isopropoxy dimethyl silyl propyl) amine, bis(isopropoxy diethyl silyl)ethane, bis(isopropoxy diethyl silyl) hexane, bis(isopropoxy diethyl silyl propyl) amine, or bis(isopropoxy diethyl silyl propyl) amine.

In one embodiment, when n=1 and m=2, the catalyst (b) with the structure of formula (II) can be (dimethoxy methyl silyl) (methoxy dimethyl silyl)ethane, (dimethoxy methyl silyl) (methoxy dimethyl silyl) hexane, [(dimethoxy methyl silyl) propyl]-[(methoxy dimethyl silyl) propyl]amine, (dimethoxy ethyl silyl)(methoxy diethyl silyl)ethane, (dimethoxy ethyl silyl)(methoxy diethyl silyl) hexane, [(dimethoxy ethyl silyl) propyl]-[(methoxy diethyl silyl) propyl]amine, (diethoxy methyl silyl)(ethoxy dimethyl silyl)ethane, (diethoxy methyl silyl) (ethoxy dimethyl silyl) hexane, [(diethoxy methyl silyl) propyl]-[(ethoxy dimethyl silyl) propyl]amine, (diethoxy ethyl silyl) (ethoxy diethyl silyl)ethane, (diethoxy ethyl silyl) (ethoxy diethyl silyl) hexane, [(diethoxy ethyl silyl) propyl]-[(ethoxy diethyl silyl) propyl] amine, (dipropoxy methyl silyl) (propoxy dimethyl silyl)ethane, (dipropoxy methyl silyl)(propoxy dimethyl silyl) hexane, [(dipropoxy methyl silyl) propyl]-[(propoxy dimethyl silyl) propyl]amine, (dipropoxy ethyl silyl)(propoxy diethyl silyl)ethane, (dipropoxy ethyl silyl)(propoxy diethyl silyl) hexane, or [(dipropoxy ethyl silyl) propyl]-[(propoxy diethyl silyl) propyl]amine. When n=1 and m=3, the catalyst (b) with the structure of formula (II) can be (methoxy dimethyl silyl)(trimethoxy silyl)ethane, (methoxy dimethyl silyl) (trimethoxy silyl) hexane, [(methoxy dimethyl silyl) propyl]-[(trimethoxy silyl) propyl]amine, (methoxy diethyl silyl) (trimethoxy silyl)ethane, (methoxy diethyl silyl)(trimethoxy silyl) hexane, [(methoxy diethyl silyl) propyl]-[(trimethoxy silyl) propyl]amine, (ethoxy dimethyl silyl)(triethoxy silyl) ethane, (ethoxy dimethyl silyl) (triethoxy silyl) hexane, [(ethoxy dimethyl silyl) propyl]-[(triethoxy silyl) propyl] amine, (ethoxy diethyl silyl)(triethoxy silyl)ethane, (ethoxy diethyl silyl) (triethoxy silyl) hexane, [(ethoxy diethyl silyl) propyl]-[(triethoxy silyl) propyl]amine, (propoxy dimethyl silyl) (tripropoxy silyl)ethane, (propoxy dimethyl silyl) (tripropoxy silyl) hexane, [(propoxy dimethyl silyl) propyl]-[(tripropoxy silyl) propyl]amine, (propoxy diethyl silyl) (tripropoxy silyl)ethane, (propoxy diethyl silyl)(tripropoxy silyl) hexane, or [(propoxy diethyl silyl) propyl]-[(tripropoxy silyl) propyl]amine. When n=2 and m=2, the catalyst (b) with the structure of formula (II) can be bis(dimethoxy methyl silyl)ethane, bis(dimethoxy methyl silyl) hexane, bis (dimethoxy methyl silyl propyl) amine, bis(dimethoxy ethyl silyl)ethane, bis(dimethoxy ethyl silyl) hexane, bis (dimethoxy ethyl silyl propyl) amine, bis(diethoxy methyl silyl)ethane, bis(diethoxy methyl silyl) hexane, bis(diethoxy methyl silyl propyl) amine, bis(diethoxy ethyl silyl)ethane, bis(diethoxy ethyl silyl) hexane, bis(diethoxy ethyl silyl propyl) amine, bis(dipropoxy methyl silyl)ethane, bis(dipropoxy methyl silyl) hexane, bis(dipropoxy methyl silyl propyl) amine, bis(dipropoxy ethyl silyl)ethane, bis(dipropoxy ethyl silyl) hexane, bis(dipropoxy ethyl silyl propyl) amine, bis (diisopropoxy methyl silyl)ethane, bis(diisopropoxy methyl silyl) hexane, bis(diisopropoxy methyl silyl propyl) amine, bis(diisopropoxy ethyl silyl)ethane, bis(diisopropoxy ethyl silyl) hexane, or bis(diisopropoxy ethyl silyl propyl) amine.

In one embodiment, when n=2 and m=3, the catalyst (b) with the structure of formula (II) can be (dimethoxy methyl silyl) (trimethoxy silyl)ethane, (dimethoxy methyl silyl) (trimethoxy silyl) hexane, [(dimethoxy methyl silyl) propyl]-[(trimethoxy silyl) propyl]amine, (dimethoxy ethyl silyl) (trimethoxy silyl)ethane, (dimethoxy ethyl silyl) (trimethoxy silyl) hexane, [(dimethoxy ethyl silyl) propyl]-[(trimethoxy silyl) propyl]amine, (diethoxy methyl silyl) (triethoxy silyl) ethane, (diethoxy methyl silyl) (triethoxy silyl) hexane, [(diethoxy methyl silyl) propyl]-[(triethoxy silyl) propyl]amine, (diethoxy ethyl silyl) (triethoxy silyl)ethane, (diethoxy ethyl silyl) (triethoxy silyl) hexane, [(diethoxy ethyl silyl) propyl]-[(triethoxy silyl) propyl]amine, (dipropoxy methyl silyl) (tripropoxy silyl)ethane, (dipropoxy methyl silyl) (tripropoxy silyl) hexane, [(dipropoxy methyl silyl) propyl]-[(tripropoxy silyl) propyl]amine, (dipropoxy ethyl silyl) (tripropoxy silyl)ethane, (dipropoxy ethyl silyl) (tripropoxy silyl) hexane, or [(dipropoxy ethyl silyl) propyl]-[(tripropoxy silyl) propyl]amine.

In one embodiment, when n=3 and m=3, the catalyst (b) with the structure of formula (II) can be bis(trimethoxy silyl) ethane, bis(trimethoxy silyl) hexane, bis(trimethoxy silyl propyl) amine, bis(triethoxy silyl)ethane, bis(triethoxy silyl) hexane, bis(triethoxy silyl propyl) amine, bis(tripropoxy silyl)ethane, bis(tripropoxy silyl) hexane, bis(tripropoxy silyl propyl) amine, bis(triisopropoxy silyl)ethane, bis(triisopropoxy silyl) hexane, bis(triisopropoxy silyl propyl) amine.

The catalyst (c) of the present invention is a alkyl aluminum compound with a structure of Formula (III):

Formula (III)

where $R^8$, $R^9$ and $R^{10}$ are identical or different substituents and are ones selected from the group consisting of $C_1$~$C_{12}$ alkyl, $C_6$~$C_{12}$ aryl, hydrogen atom and halogen atom.

According to the hydrogenation catalyst composition of the present invention, the catalyst (c) therein can be trimethyl aluminum, triethyl aluminum, tri-n-propyl aluminum, triisopropyl aluminum, tributyl aluminum, tri(sec-butyl) aluminum, tri(isobutyl) aluminum, tri(n-pentyl) aluminum, tri(isopentyl) aluminum, tri(n-hexyl) aluminum, tri(isohexyl) aluminum, tri(1-methyl pentyl) aluminum, tri(2,5-dimethyl octyl) aluminum, tri(2,6-dimethyl octyl) aluminum, triphenyl aluminum, diethyl aluminum chloride, ethyl aluminum dichloride, tripropyl aluminum chloride, dibutyl aluminum chloride, diisobutyl aluminum chloride or butyl aluminum dichloride.

The hydrogenation of the present invention involves bringing the conjugated diene polymer dissolved in an inert organic solvent or an inert organic solvent mixed with an ether and/or amine polar compound into contact with hydrogen in the presence of the hydrogenation catalyst composition of the present invention. Thus, the unsaturated double bonds in the conjugated diene units of the conjugated diene polymer are selectively hydrogenated. The hydrogenation catalyst composition of the present invention includes hydrogenation catalyst compositions (a), (b) and (c) as mentioned above. Specifically, for example, gaseous hydrogen is introduced into the conjugated diene polymer. Then, the method of stirring or blasting is conducted to allow complete contact between the hydrogen and conjugated diene polymer. The hydrogenation can be conducted by a batch or continuous methods.

The sequence of adding the hydrogenation catalysts (a), (b) and (c) is not confined. For example, the catalyst (b) can be first added to the polymer solution, and then a mixed solution of catalysts (a) and (c) are added. Alternatively, catalyst (b) can be first added to the polymer solution, and followed by the catalyst (a) solution and the catalyst (c) solution, respectively. When all the catalysts are added to the polymer solution, which is stored under the inert gas environment. The catalyst composition still has relatively good activity even after the storage for a long time. Therefore, the catalyst composition of the present invention suitably meets the requirements of industrial mass production.

According to the present invention, the inert organic solvent to dissolve the hydrogenation catalysts and the conjugated diene polymer can be a linear or branched hydrocarbon compound such as pentane, hexane, heptane, octane and the like, or can be a cyclic hydrocarbon compound such as cyclohexane, cycloheptane, and methyl heptane. Cyclohexane and n-hexane are the suitable examples. Alternatively, the inert organic solvent can be aromatic hydrocarbon such as benzene, toluene, xylene and ethyl benzene.

Preparation of catalysts (a), (b) and (c) should be conducted under inert gas and low water content. The inert gas refers to helium, neon, nitrogen and the like, which will not participate in the hydrogenation. Air, oxygen or high water content atmosphere will oxidize or decompose the hydrogenation catalysts, and cause the deactivation in the catalysts. In the condition under which the catalyst is pre-mixed, the temperature is preferably ranged from 0° C. to 200° C. The catalyst would be deactivated at higher temperature, but the hydrogenating ability would be lost since the activity of catalyst would be too low at too low temperature.

According to the present invention, the conjugated diene polymers to be hydrogenated in the present invention can be produced by the following methods, such as anionic polymerization, cationic polymerization, free radical polymerization, complex polymerization, solution polymerization, and emulsion polymerization. It is preferable to use an organic lithium compound as an initiator for the catalysis to obtain a living polymer, which contains a carbon-lithium ion at the terminal end of the molecule chain. Therefore, when the monomer is further added, the polymerization can further proceed to grow the molecule chain. The examples of monolithio compounds for such organic lithium compounds are n-propyl lithium, iso-propyl lithium, n-butyl lithium, iso-butyl lithium, tert-butyl lithium, n-pentyl lithium, phenyl lithium and tolyl lithium. The examples of dilithio hydrocarbon are 1,4-dilithio-n-butane, 1,5-dilithio-pentane, 1,2-dilithio-diphenyl ethane, 1,4-dilithio-1,1,4,4-tetraphenyl butane, 1,3- or 1,4-bis(1-litho-3-methyl pentyl)benzene and a combination thereof. The amount of such organic lithium compound can be determined, depending on the desired molecular weight of the polymer.

The term "conjugated diene polymer" used in the present invention means a homopolymer or a copolymer of a conjugated diene. The above polymers contain an active group or a non-active group at the terminal end of the molecule chain. The active group can be free radical on carbon, anionic group of carbon alkali metal ion or cationic group on carbon. The copolymer of a conjugated diene can be random, block or graft copolymers with two or more kinds of conjugated dienes, or can be random, block or graft copolymers of at least one kind of conjugated diene monomer and at least one kind of vinyl aromatic hydrocarbon.

The conjugated diene monomers suitably used in the present invention can be the conjugated diene containing 4 to 12 carbon atoms. Representative examples include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and a mixture thereof, wherein the 1,3-butadiene, isoprene and a mixture of 1,3-butadiene and isoprene are preferred conjugated diene monomers in the present invention.

The hydrogenated styrene-butadiene copolymer suitably used in the present invention can be styrene-ethylene-butylene-styrene (SEBS) block copolymer or hydrogenated styrene-ethylene-butylene-rubber (HSBR) random copolymer. The hydrogenated styrene-isoprene copolymer suitably used in the present invention can be styrene-ethylene-propylene-styrene (SEPS) block copolymer or hydrogenated styrene-isoprene-rubber (HSIBR) random copolymer. The hydrogenated styrene-(butadiene/isoprene) copolymer suitably used in the present invention can be styrene-ethylene-ethylene-propylene-styrene (SEEPS) block or random copolymer.

The conjugated diene polymers of the present invention can have a number average molecular weight of 1000 to 1000000. The content of the conjugated diene units in the conjugated diene copolymer is in the range of 5% to 85%.

When the conjugated diene/vinyl aromatic hydrocarbon copolymer is hydrogenated, a high-value thermoplastic elastomer or random copolymer is obtained. The aromatic hydrocarbon monomers suitably used in the present invention include styrene, tert-butyl styrene, α-methyl styrene, o-methyl styrene, p-methyl styrene, divinyl benzene, 1,1-diphenyl ethylene, vinyl naphthalene, N,N-dimethyl-p-aminoethyl styrene and N,N-diethyl-p-aminoethyl styrene, preferably styrene. The representative examples of conjugated diene/vinyl aromatic hydrocarbon copolymer include (1) butadiene-styrene copolymer, (2) isoprene-styrene copolymer and (3) butadiene-isoprene-styrene copolymer.

In addition, a tertiary amine compound or ether compound can be added to the conjugated diene polymer system in order to increase the ethylene content of the conjugated diene. The suitable compounds include general tertiary amine compounds, tetrahydrofuran and diethyl ether.

Relative to 100 g of the conjugated diene polymer, the 0.0001 to 50 millimoles of the hydrogenation catalyst (a) is sufficient. It will lose economical efficiency, and the process for the catalyst removal is required when more than 50 millimoles are used. Preferably, the hydrogenation catalyst (a) is added in an amount of 0.001 to 50 millimoles relative to 100 g of the conjugated diene polymer.

Preferably, the molar ratio of the hydrogenation catalyst (b) to the hydrogenation catalyst (a) is in the range of 0.1 to 50. If the molar ratio is less than 0.1, the hydrogenation catalyst can not efficiently increase the hydrogenation activity, thus hydrogenation may stop in the late stage, and the ideal goal can not be achieved. If the molar ratio is higher than 50, the catalyst must be removed and unnecessary secondary reaction easily occurs and hinders the hydrogenation. The preferred molar ratio of the hydrogenation catalyst (b) to the hydrogenation catalyst (a) is in the range of 0.1 to 50.

Preferably, the molar ratio of the hydrogenation catalyst (c) to the hydrogenation catalyst (a) is in the range of 0.1 to 50. If the molar ratio is less than 0.1, the catalyst (a) can not be activated, and the hydrogenation conversion is poor. If the molar ratio is higher than 50, the unnecessary secondary products are generated, the hydrogenation conversion will rapidly drop, and the further process for the catalyst removal is required.

The hydrogenation reaction of the present invention can be conducted at a temperature of 0° C. to 200° C. If the reaction temperature is lower than 0° C., the reaction rate is too low and the amount of the catalyst (a) must be increased against the economical efficiency. If the reaction temperature is higher than 200° C., the catalyst will be deactivated, and thus the catalytic activity decreases. Also, side reaction easily occurs, the polymer may decompose, and the gelation may occur. Preferably, the hydrogenation temperature is 40° C. to 150° C.

The hydrogenation can be conducted preferably under the hydrogen pressure of 1 $kg/cm^2$ to 90 $kg/cm^2$. When the hydrogen pressure is less than 1 $kg/cm^2$, the reaction rate becomes not obvious. When the hydrogen pressure is higher than 90 $kg/cm^2$, the temperature will ramp up, and the hydrogenation will rapidly stop. The more preferred range for the hydrogen pressure is 2 $kg/cm^2$ to 50 $kg/cm^2$. The catalyst amount can be decreased by increasing the hydrogen pressure under the above hydrogenation conditions. In order to decrease the catalyst amount, it is preferable to conduct hydrogenation under higher hydrogen pressure.

According to the present invention, the hydrogenation time can be several seconds to 40 hours. The suitable range can be adjusted by the reaction conditions such as the ratio of the catalysts, hydrogen pressure, and hydrogenation temperature.

According to the present invention, the catalyst composition amount, hydrogen pressure and hydrogenation temperature can be adjusted in order to achieve the desired hydrogenation conversion of double bonds in the conjugated diene polymer. Using the catalyst composition of the present invention to hydrogenate the conjugated diene/vinyl aromatic hydrocarbon copolymer, at least 50%, even higher than 90%, of the unsaturated double bonds in the conjugated diene units are hydrogenated. In contrast, lower than 10%, and even lower than 3%, of the double bonds in the aromatic ring (such as benzene ring) of the vinyl aromatic hydrocarbon units are hydrogenated. That is to say; the catalyst composition of the present invention has relatively good catalytic selectivity. The hydrogenation conversion for the conjugated diene units can be detected by IR spectrum analysis, and the hydrogenation conversion for the vinyl aromatic hydrocarbon units can be detected by UV spectrum analysis, which can be referred to U.S. Pat. No. 4,501,857.

The polymer solution obtained after the hydrogenation by using the hydrogenation catalyst composition of the present invention can be coagulated by adding a polar solvent. Such polar solvent is a poor solvent for the hydrogenated polymer, such as methanol or acetone. Alternatively, the hydrogenated polymer solution can be poured into hot water and stirred, to evaporate the solvents, or the hydrogenated polymer solution can be directly heated to evaporate the solvent for separating the hydrogenated polymers.

According to the present invention, the conjugated diene polymer can be successfully hydrogenated using a small amount of a hydrogenation catalyst composition with relatively high activity. Since most catalyst is separated from the polymer or decomposes during the polymer separation procedure. Therefore, there is no need to wash or remove the catalyst from the hydrogenated polymer.

A specific feature of the catalyst composition of the present invention is described in the following. The catalyst (b) in the present invention is a fully-substituted silane with the Si—R and Si—OR structures, does not contain any hydrogen attached to Si, thus can hardly be hydrolyzed or reacted with the functional group with strong polarity, can be stored in the room temperature, and can suitably serve as a catalysis assistant agent for the hydrogenation reaction. Furthermore, the catalyst (b) can combine with other catalysts to stabilize other catalysts and enhance the catalytic activity thereof. Therefore, when the catalyst composition of the present invention is added to the conjugated diene polymer, the solution can be stored for a period of time in the inert gas environment, generally more than 30 minutes, and still has high catalytic activity with good reproducibility. Another feature is that the catalyst composition of the present invention still has high hydrogenation activity at higher temperature. In addition, the catalyst composition of the present invention will not lose the catalytic activity at high hydrogenation reaction temperature. Therefore, it is very suitable for commercial mass production.

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Embodiment 1

Preparation of SBS Copolymer

The 5400 g of cyclohexane, 7.4 millimoles of n-butyl lithium and 252 millimoles of tetrahydrofuran (THF) were charged in 10 L of a heater equipped with a stirrer. Then, 96 g of styrene was added and the polymerization was conducted at 45° C. Then, after the polymerization, the 400 g of 1,3-butadiene was added for the reaction. After the reaction, 96 g of styrene was added for the further polymerization, and the solution was placed inside the tank sealed with nitrogen. The above same polymerization steps were repeated and the reactants were placed inside the same tank sealed with nitrogen. After mixing, an SBS (styrene-butadiene-styrene) tri-block copolymer solution with solid content of 9.7% and weight average molecular weight of 230,000 can be obtained.

Embodiment 2

The 1000 g of the polymer solution of SBS tri-block copolymer prepared from Embodiment 1 was transferred to a pressure-resistant hydrogenation chamber and maintained under the nitrogen gas. The 0.11 millimoles of bis(trimethoxy silyl) hexane was dissolved in 10 ml of cyclohexane at room temperature, 0.11 millimoles of bis(trimethoxy silyl) hexane and 0.16 millimoles of n-butyl lithium were mixed in 10 ml of cyclohexane in a glove box, and 0.055 millimoles of bis (cyclopentadienyl) titanium dichloride and 0.66 millimoles of triisobutyl aluminum were mixed in 20 ml of cyclohexane.

The above solutions were added to the SBS copolymer solution. Hydrogen was fed in under a pressure of 25 kg/cm$^2$ to undergo hydrogenation at 100° C.

Figure 1:
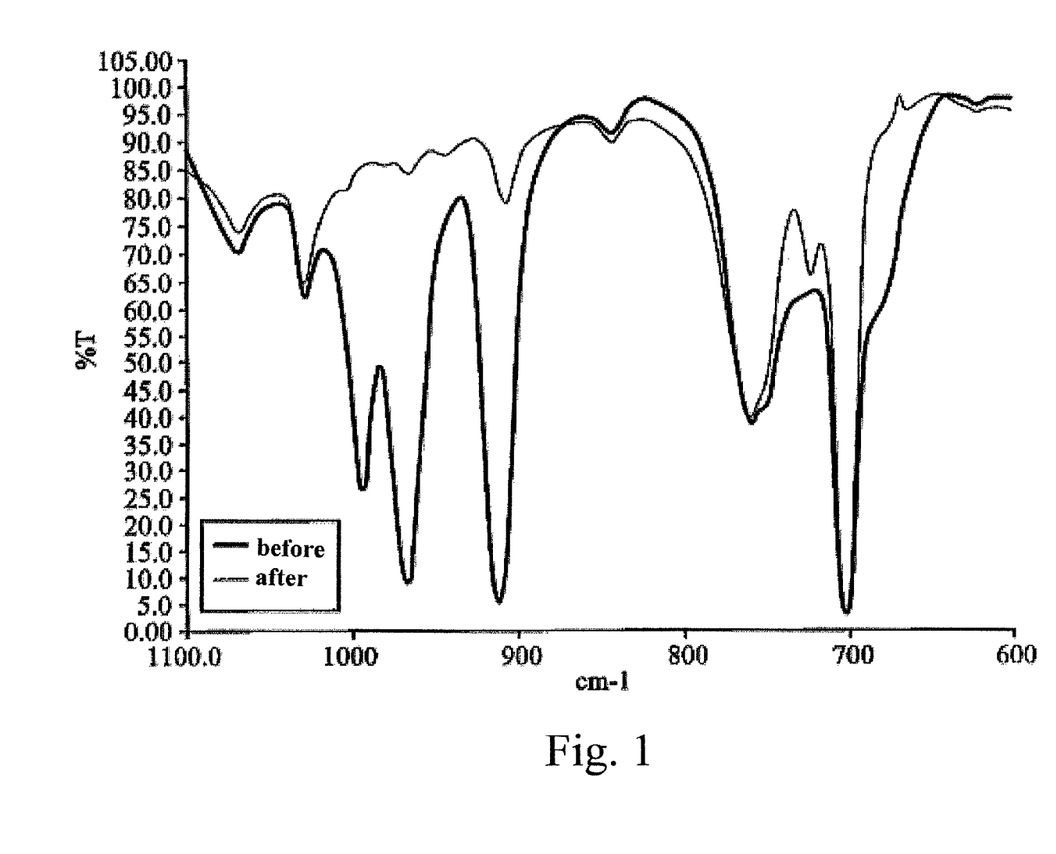
FIG. 1 is the schematic diagram showing the infrared spectra of the styrene-butadiene-styrene copolymers before and after the hydrogenation reactions according to one embodiment of the present invention.

FIG. 1 shows IR spectra of the SBS copolymer before and after hydrogenation. It can be seen that in the spectrum of the SBS tri-block copolymer before hydrogenation, the trans double bond is present at the peaks with the wave numbers of 968 cm$^{-1}$ and 995 cm$^{-1}$ and the double bonds of the 1,2-vinyl group is present at the peak with the wave number of 912 cm$^{-1}$. After one hour of hydrogenation, the hydrogenation conversion was measured to reach 87.5%. After 5 hours of hydrogenation, it can be seen that the above peaks disappear obviously, the hydrogenation conversion (the hydrogenation conversion of the unsaturated double bond of the 1,3-butadiene unit) was measured to be 95.2%. The hydrogenation data are summarized in Table 1.

Embodiment 3

The 1000 g of the polymer solution of SBS tri-block copolymer prepared from Embodiment 1 was transferred to a pressure-resistant hydrogenation chamber and maintained under the nitrogen gas. The 0.11 millimoles of bis(trimethoxy silyl) hexane was dissolved in 10 ml of cyclohexane, the 0.055 millimoles of bis(cyclopentadienyl) dimethoxy titanium was dissolved in 10 ml of cyclohexane, and the 0.66 millimoles of triethyl aluminum was dissolved in 10 ml of cyclohexane at room temperature. The above solutions were added to the SBS copolymer solution. Hydrogen was fed in under a pressure of 25 kg/cm$^2$ to undergo hydrogenation at 100° C. After one hour of hydrogenation, the hydrogenation conversion was measured to reach 87.5%. After 2 hours, the hydrogenation conversion was measured to reach 98%. The hydrogenation data are summarized in Table 1.

Embodiment 4

As the same method of Embodiment 3, the 0.11 millimoles of bis(diethoxy methyl silyl)ethane was dissolved in 10 ml of cyclohexane at room temperature, the 0.055 millimoles of bis(cyclopentadienyl) diphenyl titanium was dispersed in 10 ml of cyclohexane, and 0.66 millimoles of diisobutyl aluminum was dissolved in 10 ml of cyclohexane. The above solutions were added to the SBS copolymer solution. Hydrogen was fed in under the pressure of 25 kg/cm$^2$ to undergo hydrogenation at 100° C. After one hour of hydrogenation, the hydrogenation conversion was measured to reach 94.3%. After 2 hours, the hydrogenation conversion was measured to reach 98.5%. The hydrogenation data are summarized in Table 1.

Embodiment 5

The same procedures described in Embodiment 3 were repeated except that bis(trimethoxy silyl) hexane was replaced with 0.11 millimoles of bis(trimethoxy silyl propyl) amine dissolved in 10 ml of cyclohexane. In addition, 0.055 millimoles of bis(cyclopentadienyl) titanium dichloride was dissolved in 10 ml of cyclohexane, and 0.66 millimoles of triisobutyl aluminum was dissolved in 10 ml of cyclohexane. The above solutions were added into the SBS copolymer solution. Hydrogen was fed in under the pressure of 25 kg/cm$^2$ to undergo hydrogenation at 100° C. After one hour, the hydrogenation conversion was measured to reach 93.5%. After 2 hours, the hydrogenation conversion was measured to reach 93.5%. The hydrogenation data are summarized in Table 1.

Embodiment 6

As the same method described in Embodiment 3, 0.11 millimoles of bis(trimethoxy silyl) hexane was dissolved in 10 ml of cyclohexane. In addition, 0.055 millimoles of bis (cyclopentadienyl) titanium dichloride was dissolved in 10 ml of cyclohexane, and 0.33 millimoles of triethyl aluminum was dissolved in 10 ml of cyclohexane. The above solutions were added into the SBS copolymer solution. Hydrogen was fed in under the pressure of 25 kg/cm$^2$ to undergo hydrogenation at 120° C. After one hour, the hydrogenation conversion was measured to reach 84.9%. After 5 hours, the hydrogenation conversion was measured to reach 91.1%. The hydrogenation data are summarized in Table 1.

Comparative Embodiment 1

The same procedures described in Embodiment 3 were repeated except that bis(trimethoxy silyl) hexane was not added. 0.055 millimoles of bis(cyclopentadienyl) titanium dichloride was dispersed in 10 ml of cyclohexane, and 0.33 millimoles of triisobutyl aluminum was dissolved in 10 ml of cyclohexane. The above solutions were added to the SBS copolymer solution. Hydrogen was fed in under the pressure of 25 kg/cm$^2$ to undergo hydrogenation at 100° C.

Figure 2:
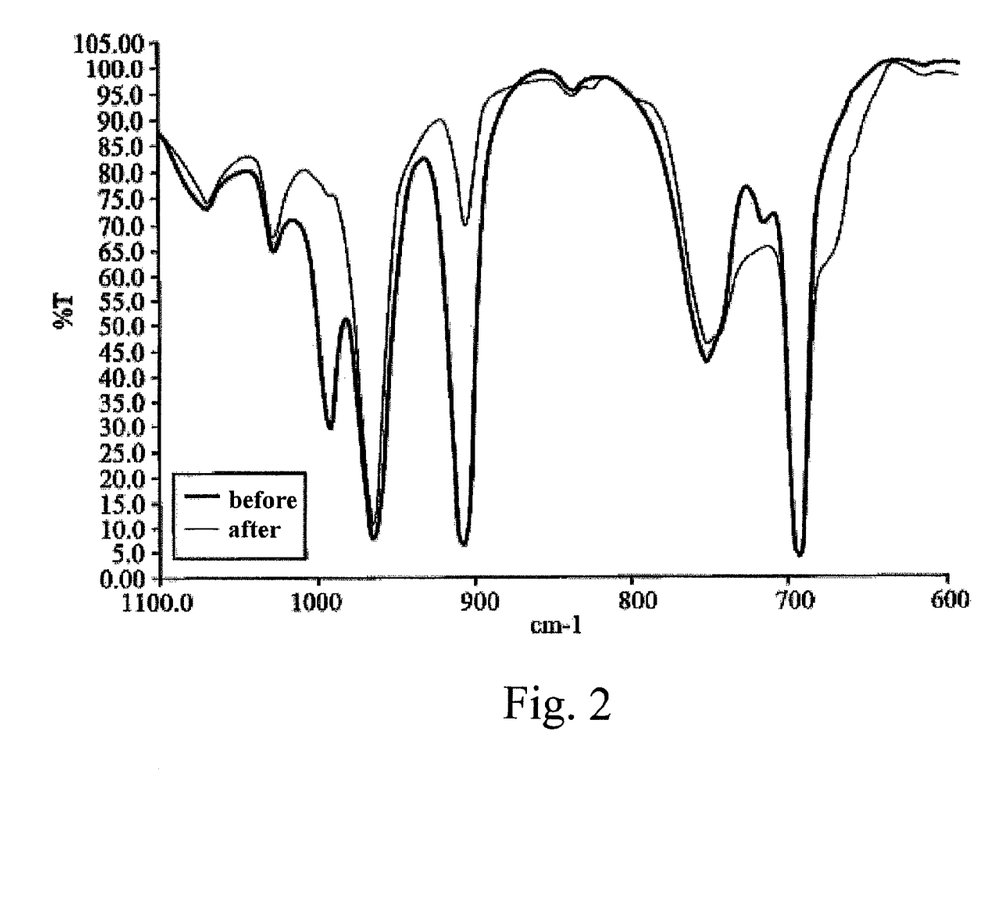
FIG. 2 is the schematic diagram showing the infrared spectra of the styrene-butadiene-styrene copolymers before and after the hydrogenation reactions according to one comparative embodiment of the present invention.

FIG. 2 shows IR spectra of the SBS copolymer before and after hydrogenation. It can be seen that in the spectrum of the SBS tri-block copolymer before hydrogenation, the trans double bond is present at the peaks with the wave numbers of 968 cm$^{-1}$ and 995 cm$^{-1}$ and the double bond of the 1,2-vinyl group is present at the peak with the wave number of 912 cm$^{-1}$. After one hour of hydrogenation, it can be seen that the peaks at 995 cm$^{-1}$ and 912 cm$^{-1}$ have decreased, but the peak at 968 cm$^{-1}$ has almost no change. At that time, the hydrogenation conversion was measured to be 23%. The hydrogenation data are summarized in Table 1.

Comparative Embodiment 2

The 1000 g of the polymer solution of SBS tri-block copolymer prepared from Embodiment 1 was transferred to a pressure-resistant hydrogenation chamber. The SBS copolymer was fed with hydrogen and stirred for 30 minutes. The same procedures described in Embodiment 3 were repeated except that bis(trimethoxy silyl) hexane was replaced with 0.22 millimoles of n-butyl lithium. The 0.055 millimoles of bis(cyclopentadienyl) titanium dichloride was dispersed in 10 ml of cyclohexane, and 0.44 millimoles of triisobutyl aluminum was dissolved in 10 ml of cyclohexane. The above solutions were added into the SBS copolymer solution. Hydrogen was fed in under the pressure of 25 kg/cm$^2$ to undergo hydrogenation at 100° C. The hydrogenation conversion was measured to reach 15% after 30 minutes, and reach 24% after one hour.

TABLE 1

| Embodiment No. | Residual trans double bonds (%) | Residual 1,2-vinyl double bonds (%) | 1,3-butadiene hydrogenation conversion (%) | benzene ring hydrogenation conversion (%) |
|---|---|---|---|---|
| Embodiment 2 | 3.5 | 0.3 | 95.2 | <5 |
| Embodiment 3 | 1.5 | 0.2 | 98.0 | <5 |
| Embodiment 4 | 1.1 | 0.2 | 98.5 | <5 |
| Embodiment 5 | 2.4 | 0.3 | 96.5 | <5 |
| Embodiment 6 | 7.2 | 0.7 | 91.1 | <5 |
| Comp. Emb. 1 | 75.5 | 1.5 | 23.0 | <5 |
| Comp. Emb. 2 | 74.4 | 1.6 | 24.0 | <5 |

From Table 1, in hydrogenating a conjugated diene polymer using the catalyst compositions of the present invention, the percentages of the residual trans double bonds and the residual 1,2-vinyl double bonds are lower than 9% and 5%, respectively, and the percentage of the 1,3-butadiene hydrogenation conversion is higher than 89%. On the other hand, the percentages of the residual trans double bonds and the residual 1,2-vinyl double bonds for the Comparative Embodiments 1 and 2 are much higher than those for the Embodiments 1-6, since the catalyst compositions of the comparative Embodiments 1 and 2 do not include the catalyst (b) of the present invention, and the percentages of the 1,3-butadiene hydrogenation conversion for the comparative Embodiments 1 and 2 are lower than 25%.

Accordingly, the present invention provides a catalyst composition for the successful hydrogenation of conjugated diene polymers by using a small amount of a hydrogenation catalyst composition with relatively high hydrogenation catalytic ability. The catalyst (b) in the present invention is a fully-substituted silane with the substituents Si—R and Si—OR structures, can hardly be reacted with oxygen, and can be combined with the other catalysts to stabilize the hydrogenation catalyst composition and to enhance the catalytic activity of the other catalysts. The catalyst composition of the present invention can be stored for a long period of time, and maintains good stability and reproducibility for the catalytic activity, and accordingly the high economical efficiency can be successfully met. Moreover, the catalyst composition of the present invention can have very high hydrogenation activity over a quite wide range of temperatures. In several embodiments of the present invention, the catalytic reaction temperature can reach 100° C., and the preferred hydrogenation reaction temperature is in the range of 40° C. to 150° C. In addition, the catalyst composition of the present invention will not lose the catalytic activity under high heat of the hydrogenation reaction, and is therefore very suitable for the operation requirements of industrial continuous production.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A catalyst composition for hydrogenating a conjugated diene polymer, which is one of a homopolymer formed by a conjugated diene and a copolymer formed by the conjugated diene and a vinyl aromatic, comprising:

a titanium compound, wherein the titanium compound is $(Cp^*)_2TiR^1R^2$, wherein either one of the $R^1$ and the $R^2$ is one selected from a group consisting of hydrogen, halogen, $C_1$~$C_8$ alkyl, $C_1$~$C_8$ alkoxy, $C_6$~$C_{12}$ cycloalkyl, phenyl, phenoxy, $C_7$~$C_{10}$ arylalkoxy, $C_7$~$C_{10}$ arylalkyl, carboxy, —$CH_2P(phenyl)_2$, —$CH_2Si(C_1$~$C_5$ alkyl$)_3$ and —$P(phenyl)_2$, and the $Cp^*$ is one selected from a group consisting of cyclopendienyl, fluorenyl, indenyl and derivatives thereof;

a compound having a structure of Formula (II):

Formula (II)

wherein the $R^5$ is one selected from a group consisting of $C_1$~$C_{12}$ alkyl, $C_1$~$C_{12}$ alkenyl, $C_1$~$C_{12}$ amide, $C_1$~$C_{12}$ ether, $C_1$~$C_{12}$ ketone and $C_1$~$C_{12}$ ester, either one of the $R^3$ and the $R^6$ is one of $C_1$~$C_{12}$ alkyl and $C_1$~$C_{12}$ alkenyl, either one of the $R^4$ and the $R^7$ is one selected from a group consisting of $C_1$~$C_{12}$ alkyl, $C_1$~$C_{12}$ alkenyl, $C_1$~$C_{12}$ amide, $C_1$~$C_{12}$ ether, $C_1$~$C_{12}$ ketone and $C_1$~$C_{12}$ ester, n and m are natural numbers, $1 \leq n \leq 3$, and $1 \leq m \leq 3$; and an alkyl aluminum.

2. A catalyst composition according to claim 1, wherein the derivative is formed by substituting at least a hydrogen on one selected from a group consisting of the cyclopendienyl, the fluorenyl and the indenyl, with a substituting group selected from a group consisting of methyl, methoxy, p-tert-butylphenyl, pentafluorophenyl, trifluorophenyl, and 3,5-(tert-butyl)-4-methoxyphenyl.

3. A catalyst composition according to claim 1, wherein the titanium compound includes one selected from a group consisting of dicyclopentadienyl titanium halide, dicyclopentadienyl alkoxy titanium, dicyclopentadienyl alkyl titanium, difluorenyl titanium halide, diindenyl titanium halide, alkoxy difluorenyl titanium, alkyl difluorenyl titanium, alkoxy diindenyl titanium, alkyl diindenyl titanium, and derivatives thereof.

4. A catalyst composition according to claim 3, wherein the titanium compound includes one selected from a group consisting of bis(cyclopentadienyl) titanium difluorides, bis(cyclopentadienyl) titanium dichloride, bis(2,4-diphenyl phosphine cyclopentadienyl) titanium difluoride, bis(2,4-dimethyl phosphine cyclopentadienyl) titanium difluoride, bis(2,4-dimethyl phosphine cyclopentadienyl) titanium dichloride, bis(methoxy cyclopentadienyl) titanium dichloride, bis(2,4-dimethyl phosphine cyclopentadienyl) titanium dichloride, bis(cyclopentadienyl) titanium dibromide, bis(2,4-diphenyl phosphine cyclopentadienyl) titanium dibromide, bis(2,4-dimethyl phosphine cyclopentadienyl) titanium dibromide, bis(ethyl cyclopentadienyl) titanium dichloride, bis(n-propyl cyclopentadienyl) titanium dichloride, bis(n-butyl cyclopentadienyl) titanium dichloride, bis(2-ethyl hexyl cyclopentadienyl) titanium dichloride, dimethyl dicyclopentadienyl titanium, dimethoxy dicyclopentadienyl titanium, dimethyl bis(2,4-diphenyl phosphine cyclopentadienyl) titanium, dimethoxy bis(2,4-dimethyl phosphine cyclopentadienyl) titanium, diethyl dicyclopentadienyl titanium, diethyl bis(2,4-diphenyl phosphine cyclopentadienyl) titanium, diethoxy bis(2,4-dmethyl phosphine cyclopentadienyl) titanium, diphenoxy bis(2,4-diphenyl phosphine cyclopentadienyl) titanium, diphenoxy bis(2,4-dimethyl phosphine cyclopentadienyl) titanium, difluorenyl titanium dichloride, diindenyl titanium dichloride, bis(dimethoxy fluorenyl) titanium dichloride, difluorenyl titanium difluoride, diindenyl titanium difluoride, bis(dimethoxy fluorenyl) titanium difluoride, difluorenyl titanium dibromide, diindenyl titanium dibromide, diindenyl titanium dichloride, bis(dimethoxy fluorenyl) titanium dibromide, diindenyl titanium dibromide, dimethyl difluorenyl titanium, dimethoxy difluorenyl titanium, dimethoxy diindenyl titanium, dimethoxy bis (dimethoxy fluorenyl) titanium, diphenoxy difluorenyl titanium, diphenoxy diindenyl titanium, diphenoxy bis (dimethoxy fluorenyl) titanium and diphenoxy diindenyl titanium.

5. A catalyst composition according to claim 1, wherein either one of the $R^3$ and the $R^6$ is $C_1$~$C_8$ alkyl, either one of the $R^4$ and the $R^7$ is one selected from a group consisting of $C_1$~$C_8$ alkyl, $C_1$~$C_8$ amide, $C_1$~$C_8$ ether and $C_1$~$C_8$ ketone, and the $R^5$ is one selected from a group consisting of $C_1$~$C_8$ alkyl, $C_1$~$C_8$ amide, $C_1$~$C_8$ ether and $C_1$~$C_8$ ketone.

6. A catalyst composition according to claim 1, wherein either one of the $R^3$ and the $R^6$ is $C_1$~$C_4$ alkyl, either one of the $R^4$ and the $R^7$ is $C_1$~$C_6$ alkyl, and the $R^5$ is $C_1$~$C_8$ alkyl.

7. A catalyst composition according to claim 1, wherein either one of the $R^3$ and the $R^6$ is $C_1$~$C_4$ alkyl, either one of the $R^4$ and the $R^7$ is $C_1$~$C_6$ alkyl, and the $R^5$ is $R^{11}R^{12}R^{13}N$ having one of following two conditions:
wherein the $R^{11}$, the $R^{12}$ and the $R^{13}$ are $C_1$~$C_6$ alkyls; and
wherein only one of the $R^{11}$, the $R^{12}$ and the $R^{13}$ is a hydrogen atom, and the others are $C_1$~$C_6$ alkyls.

8. A catalyst composition according to claim 1, wherein either one of the $R^3$ and the $R^6$ is $C_1$~$C_4$ alkyl, either one of the $R^4$ and the $R^7$ is $C_1$~$C_6$ alkyl, the $R^5$ is an ether of $R^{14}OR^{15}$, and either one of the $R^{44}$ and the $R^{45}$ is $C_1$~$C_6$ alkyl.

9. A catalyst composition according to claim 1, wherein either one of the $R^3$ and the $R^6$ is $C_1$~$C_4$ alkyl, either one of the $R^4$ and the $R^7$ is $C_1$~$C_6$ alkyl, the $R^5$ is a ketone of $R^{16}COR^{17}$, and either one of the $R^{16}$ and the $R^{17}$ is $C_1$~$C_6$ alkyl.

10. A catalyst composition according to claim 1, wherein either one of the $R^3$ and the $R^6$ is $C_1$~$C_4$ alkyl, either one of the $R^4$ and the $R^7$ is $C_1$~$C_6$ alkyl, $C_1$~$C_8$ amide, $C_1$~$C_8$ ether and $C_1$~$C_8$ ketone, the $R^5$ is one of $C_1$~$C_6$ alkyl and $R^{18}NHR^{19}$, and either one of the $R^{18}$ and the $R^{19}$ is $C_1$~$C_4$ alkyl.

11. A catalyst composition according to claim 1, wherein the alkyl aluminum is $R^8R^9R^{10}Al$, and each of the $R^8$, the $R^9$ and the $R^{10}$ is one selected from a group consisting of $C_1$~$C_{12}$ alkyl, $C_6$~$C_{12}$ aryl, a hydrogen atom and a halogen atom.

12. A catalyst composition according to claim 11, wherein the alkyl aluminum is one selected from a group consisting of trimethyl aluminum, triethyl aluminum, tri-n-propyl, triisopropyl aluminum, tri-n-butyl aluminum, tri-tert-butyl aluminum, triisobutyl aluminum, tri-n-pentyl aluminum, triisopentyl aluminum, tri-n-hexyl aluminum, triisohexyl aluminum, tri(1-methyl pentyl) aluminum, tri(2,5-dimethyl octyl) aluminum, tri(2,6-dimethyl octyl) aluminum, tri(2-ethyl hexyl) aluminum, triphenyl aluminum, diethyl aluminum chloride, ethyl aluminum dichloride, dipropyl aluminum chloride, dibutyl aluminum chloride, diisobutyl aluminum chloride, butyl aluminum dichloride and a combination thereof.

13. A catalyst composition according to claim 1, wherein:
the conjugated diene polymer is polymerized by a method being one selected from a group consisting of cationic polymerization, free radical polymerization, coordination polymerization and anionic polymerization;
the titanium compound, the compound having a structure of Formula (II) and the alkyl aluminum are added into the a solution of the conjugated diene polymer in a way being one of at a same time and at different times;
a usage quantity of the titanium compound is in a range of 0.001 to 50 mmol relative to 100 gram of the conjugated diene polymer;
a molar ratio of the compound having a structure of Formula (II) to the titanium compound is in a range of 0.1 to 50;
a molar ratio of the alkyl aluminum to the titanium compound is in a range of 0.1 to 50;
the conjugated diene polymer has a weight average molecular weight in a range of 1000 to 1,000,000; and
the conjugated diene polymer includes conjugated diene units in weight percentage range of 5% to 85%.

14. A hydrogenation method for hydrogenating a conjugated diene polymer, which is one of a homopolymers formed by polymerizing the conjugated diene and a copolymer formed by polymerizing the conjugated diene and a vinyl aromatic, comprising:
dissolving the conjugated diene polymer, which includes a conjugated diene unit having an unsaturated double bond, in an inert solvent;
the catalyst composition of claim 1 into the conjugated diene polymer solution; and
hydrogenating the unsaturated double bond by introducing a hydrogen gas.

15. A hydrogenation method according to claim 14, wherein:
the hydrogenating step is performed under a temperature in a range of 0° C. to 200° C. and under a pressure in a range of 1 to 90 kg/cm2;
a hydrogenation rate for the unsaturated double bond is higher than 50%; and
the conjugated diene polymer includes a vinyl aromatic unit having a phenyl double bond, and a hydrogenation rate for the phenyl double bond is lower than 10%.

16. A hydrogenation method according to claim 15, wherein the hydrogenation rate for the unsaturated double bond is higher than 90%, and the hydrogenation rate for the phenyl double bond is lower than 5%.

17. A hydrogenation method according to claim 14, wherein the copolymer is one selected from a group of a styrene-butadiene copolymer, a styrene-isoprene copolymer and a styrene-(butadiene/isoprene) copolymer.

18. A hydrogenation method according to claim 17, wherein the styrene-butadiene copolymer after the hydrogenation becomes a styrene-ethylene-butadiene-styrene copolymer, and the styrene-isoprene copolymer after the hydrogenation becomes a styrene-ethylene-propylene-styrene copolymer, and the styrene-(butadiene/isoprene) copolymer after the hydrogenation becomes a styrene-ethylene-ethylene-propylene-styrene copolymer.

19. A hydrogenation method according to claim 14, wherein the copolymer is one of a block copolymer and a random copolymer.

* * * * *